(12) United States Patent
Lee et al.

(10) Patent No.: US 11,932,227 B2
(45) Date of Patent: Mar. 19, 2024

(54) BRAKE DRIVING APPARATUS

(71) Applicant: HL MANDO CORPORATION, Gyeonggi-do (KR)

(72) Inventors: Chungjae Lee, Gyeonggi-do (KR); I Jin Yang, Gyeonggi-do (KR); Heejun Kim, Gyeonggi-do (KR); Chanhui Lee, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 18/121,583

(22) Filed: Mar. 14, 2023

(65) Prior Publication Data

US 2023/0294648 A1 Sep. 21, 2023

(30) Foreign Application Priority Data

Mar. 15, 2022 (KR) .......................... 10-2022-0031894

(51) Int. Cl.
*B60T 8/36* (2006.01)
*B60T 15/02* (2006.01)
*F15B 13/08* (2006.01)

(52) U.S. Cl.
CPC .............. *B60T 8/36* (2013.01); *B60T 15/028* (2013.01); *F15B 13/0853* (2013.01)

(58) Field of Classification Search
CPC .... B60T 15/028; B60T 13/686; B60T 8/3685; B60T 13/66
See application file for complete search history.

(56) References Cited

U.S. PATENT DOCUMENTS

| | | | | |
|---|---|---|---|---|
| 6,634,723 B1* | 10/2003 | Ganzel | ..................... | B60T 8/368 303/DIG. 10 |
| 7,189,918 B2* | 3/2007 | Sakata | ................ | B60R 16/0239 361/600 |
| 7,396,391 B2* | 7/2008 | Waida | .................. | H05K 5/0213 55/385.2 |
| 7,720,589 B2* | 5/2010 | Hashiba | .................. | B60T 8/368 477/211 |
| 8,437,134 B2* | 5/2013 | Sarginger | ............ | B60R 16/0239 174/547 |
| 8,915,338 B2* | 12/2014 | Murayama | ............ | B60T 13/662 188/352 |
| 9,516,769 B2* | 12/2016 | Kaneko | ................ | H05K 7/1427 |
| 10,549,737 B2* | 2/2020 | Leiber | ................... | B60T 13/145 |
| 11,685,355 B2* | 6/2023 | Leiber | ..................... | B60T 17/22 303/3 |

FOREIGN PATENT DOCUMENTS

DE 19826938 B4 * 12/2006 ............ B60T 15/028

\* cited by examiner

*Primary Examiner* — Thomas E Lazo
(74) *Attorney, Agent, or Firm* — Ladas & Parry, LLP

(57) ABSTRACT

A brake driving apparatus includes a hydraulic valve block including a vent channel for discharging air to the outside, an electronic control device that includes an electrical component housing open in a direction of the vent channel of the hydraulic valve block and having a ventilation hole connected to an internal space and a filter attached to the electrical component housing to block the ventilation hole so that air can pass therethrough, and is supported by one side of the hydraulic valve block, and a vent sealing member that seals a space between the hydraulic valve block and the electronic control device and surrounds the vent channel, the ventilation hole, and the filter.

6 Claims, 5 Drawing Sheets

BRAKE DRIVING APPARATUS

CROSS REFERENCE TO RELATED APPLICATION

This application claims priority from and the benefits of Korean Patent Application No. 10-2022-0031894, filed on Mar. 15, 2022, which is all hereby incorporated by reference in its entirety.

TECHNICAL FIELD

The present disclosure generally relates to a brake driving apparatus, and more particularly, to a brake driving apparatus capable of preventing a change in internal pressure due to a temperature change of one or more of an electronic control device and an electric motor.

BACKGROUND

In general, a brake driving apparatus provides a braking force to a brake according to a pedal effort of a driver of a vehicle stepping on a brake pedal. In addition, the brake reduces a speed of the vehicle by reducing a rotational speed of a wheel according to the received braking force, thereby braking the vehicle. The magnitude of this braking force is changed according to the pedal effort through switching and positioning of a plurality of solenoid valves by hydraulic pressure.

Meanwhile, in the case of a brake driving apparatus requiring a compact size due to a limited installation space, an internal pressure easily rises due to a temperature rise during an operation of an electric motor that generates a braking force. Moreover, when the internal pressure rises excessively, the electric motor may be damaged or oil leakage may occur.

Moreover, in the case of an electronic control device that controls a driving motor, the internal pressure may easily rise due to heat generated by a printed circuit board, and when the internal pressure rises excessively, the electronic control device may be damaged.

As described above, when the internal pressure rises due to the temperature change of the electric motor and electronic control device, which are the main parts of the brake driving apparatus, there are problems that the overall lifespan of the brake driving apparatus is reduced and the replacement cycle of parts is shortened.

SUMMARY

One embodiment of the present disclosure provides a brake driving apparatus capable of stably maintaining the equilibrium of internal pressure.

According to an aspect of the present disclosure, there is provided a brake driving apparatus including: a hydraulic valve block including a vent channel for discharging air to the outside; an electronic control device that includes an electrical component housing open in a direction of the vent channel of the hydraulic valve block and having a ventilation hole connected to an internal space and a filter attached to the electrical component housing to block the ventilation hole so that air can pass therethrough, and is supported by one side of the hydraulic valve block; and a vent sealing member that seals a space between the hydraulic valve block and the electronic control device and surrounds the vent channel, the ventilation hole, and the filter.

The brake driving apparatus may further include a main sealing member formed along an edge of a surface of the electrical component housing facing the hydraulic valve block while sealing a space between the hydraulic valve block and the electronic control device.

The hydraulic valve block may have a valve installed therein to control a flow of brake oil, and the electronic control device may further include a printed circuit board accommodated in the inner space of the electrical component housing and generating an electrical signal for controlling the valve of the hydraulic valve block.

The brake driving apparatus may further include an electric motor supported on the other side of the hydraulic valve block and controlled by the electronic control device.

The filter includes a membrane filter.

The vent sealing member and the main sealing member may be made of a Cured In Place Gaskets (CIPG).

According to one embodiment of the present disclosure, the brake driving apparatus can stably maintain an equilibrium of internal pressure.

DETAILED DESCRIPTION

Figure 1:
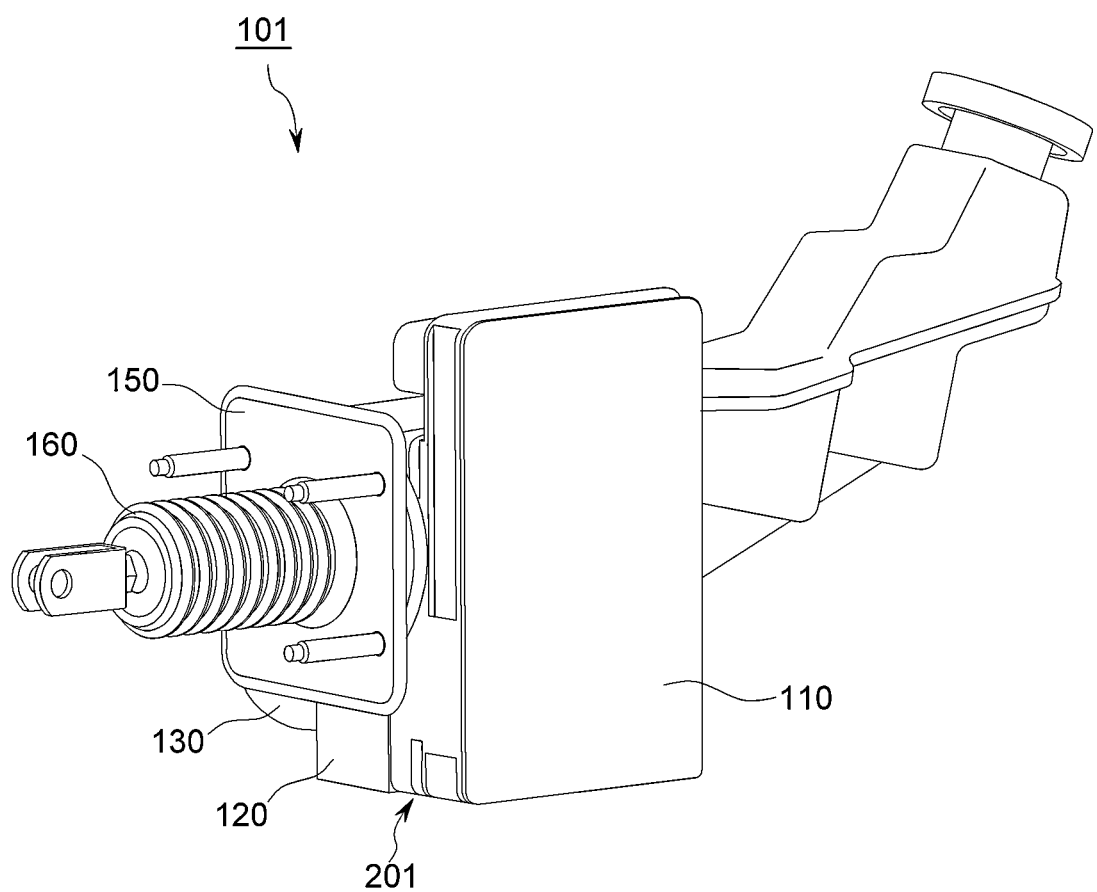
FIG. 1 is a perspective view of a brake driving device according to one embodiment of the present disclosure.

Hereinafter, an embodiment of the present disclosure will be described in detail with reference to the accompanying drawings so that those skilled in the art can easily carry out the present disclosure. The present disclosure may be embodied in many different forms and is not limited to the embodiment set forth herein.

It should be noted that the drawings are schematic and not drawn to scale. Relative dimensions and proportions of parts in the drawings are illustrated exaggerated or reduced in size for clarity and convenience in the drawings, and any dimensions are illustrative only and not limiting. Moreover, the same structure, element or part appearing in two or more drawings will have the same reference number used to indicate like features.

The embodiment of the present disclosure specifically represents an ideal embodiment of the present disclosure. As a result, various variations of the drawings are expected. Therefore, the embodiment is not limited to the specific shape of the illustrated area, and includes, for example, modification of the shape by manufacturing.

In addition, all technical terms and scientific terms used in the present disclosure have meanings commonly understood by those of ordinary skill in the art to which the present disclosure belongs, unless otherwise defined. All terms used herein are selected for the purpose of more clearly describing the present disclosure and are not selected to limit the scope of rights according to the present disclosure.

In addition, expressions such as "comprising", "including", "having", or the like used in the present disclosure should be understood in open-ended terms that imply the possibility of including other embodiments, unless otherwise stated in the phrase or sentence in which the expressions are included.

In addition, singular expressions described in the present disclosure may include plural meanings unless otherwise stated, and this applies to singular expressions described in the claims as well.

Hereinafter, a brake driving apparatus 101 according to one embodiment of the present disclosure will be described with reference to FIGS. 1 to 5.

The brake driving device 101 converts a pedal effort of a brake pedal into a constant braking pressure required for braking, and provides the converted brake pressure to the vehicle to brake the vehicle.

Figure 2:
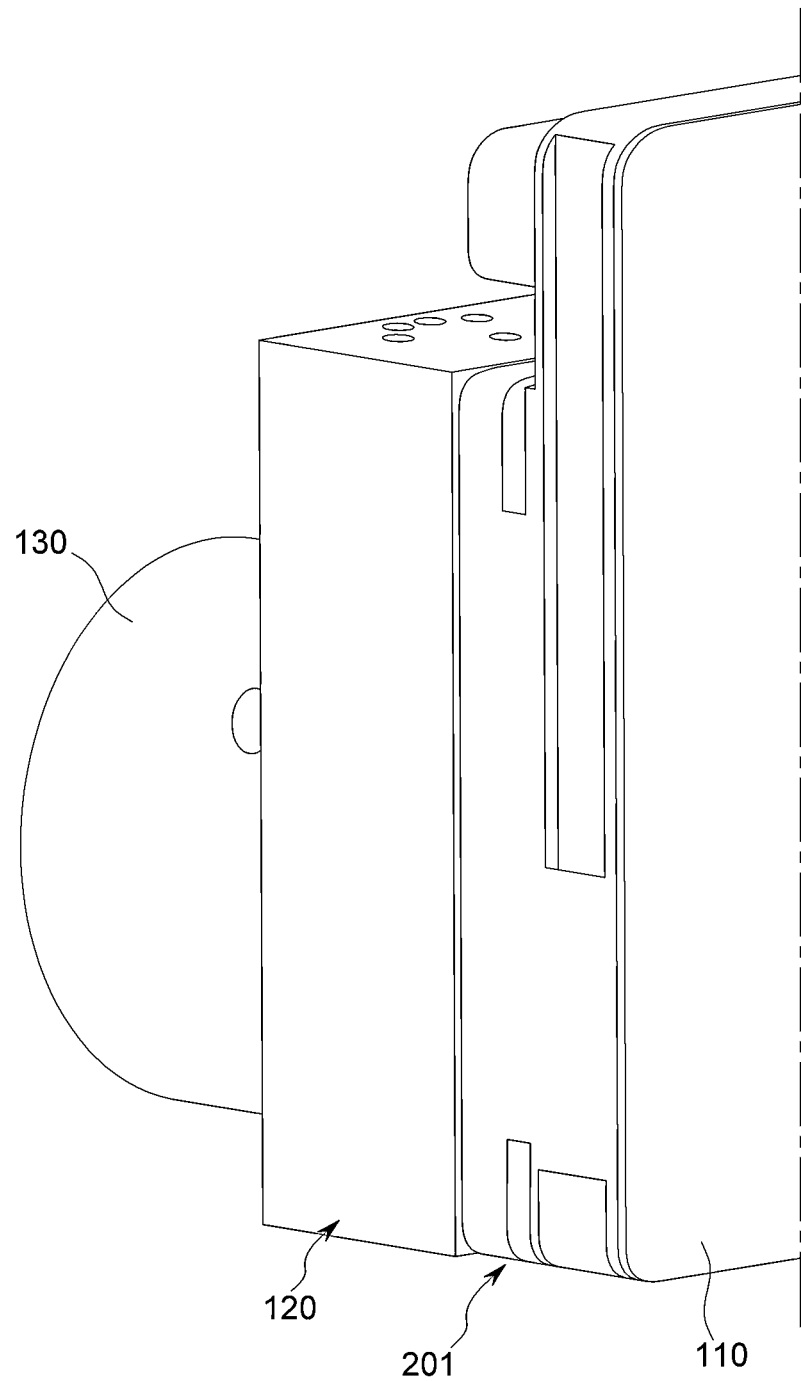
FIG. 2 is a partially enlarged perspective view of FIG. 1.

Specifically, as illustrated in FIGS. 1 and 2, the brake driving apparatus 101 includes an electronic control device (ECU) 110, a hydraulic valve block 120, and an electric motor 130.

In addition, in the brake driving apparatus 101, a mounting bracket 150 is supported by the vehicle, and a brake pedal is installed in an input rod 160 to receive the pedal effort from a driver.

A valve for controlling a flow of the brake oil is installed inside the hydraulic valve block 120, and a channel controlled by the valve may be formed therein. Here, the valve may control the supply of the brake oil through the channel. Specifically, the valve installed inside the hydraulic valve block 120 may operate according to an electrical signal input from an electronic control device 110 to be described later to control the flow of the brake oil.

In addition, in one embodiment of the present disclosure, a vent channel 129 (illustrated in FIG. 5) for discharging air to the outside may be formed in the hydraulic valve block 120.

The electronic control device 110 may receive information from sensors capable of detecting the pedal effort or a pedal displacement of the pedal or the like. The electronic control device 110 may include a printed circuit board (PCB) that generate an electrical signal for controlling the valve built in the hydraulic valve block 120 and the electric motor 130 to be described later, an electrical component housing 300 that accommodates the printed circuit board in the internal space, and a filter 400 that is attached to the electrical component housing 300. Moreover, the electronic control device 110 may be supported by one side of the hydraulic valve block 120.

Figure 3:
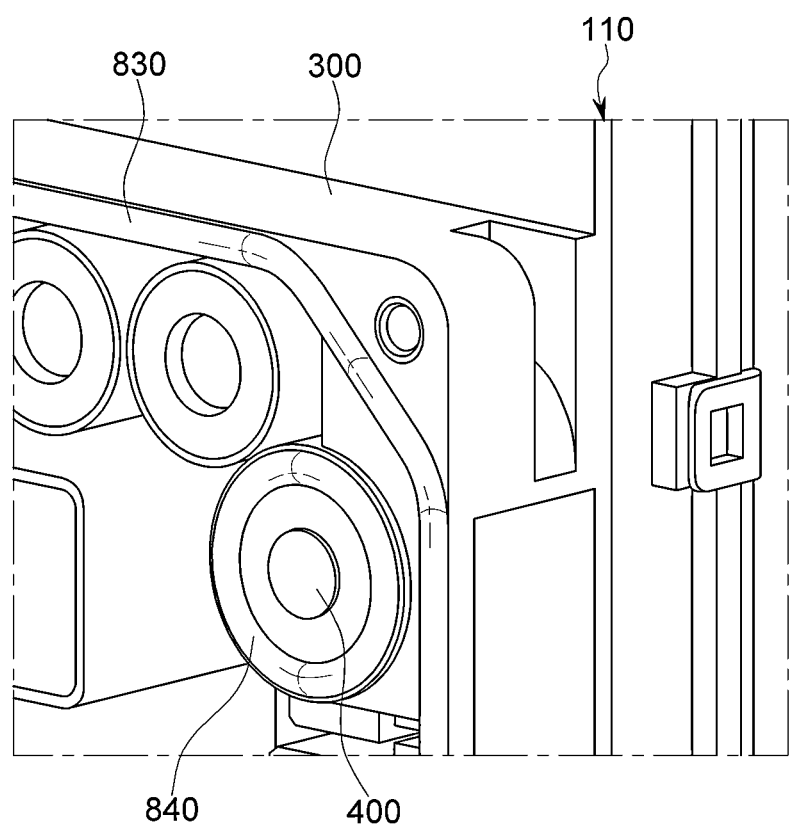
FIG. 3 is a partially enlarged perspective view illustrating a portion indicated by F3 in FIG. 2.
Figure 4:
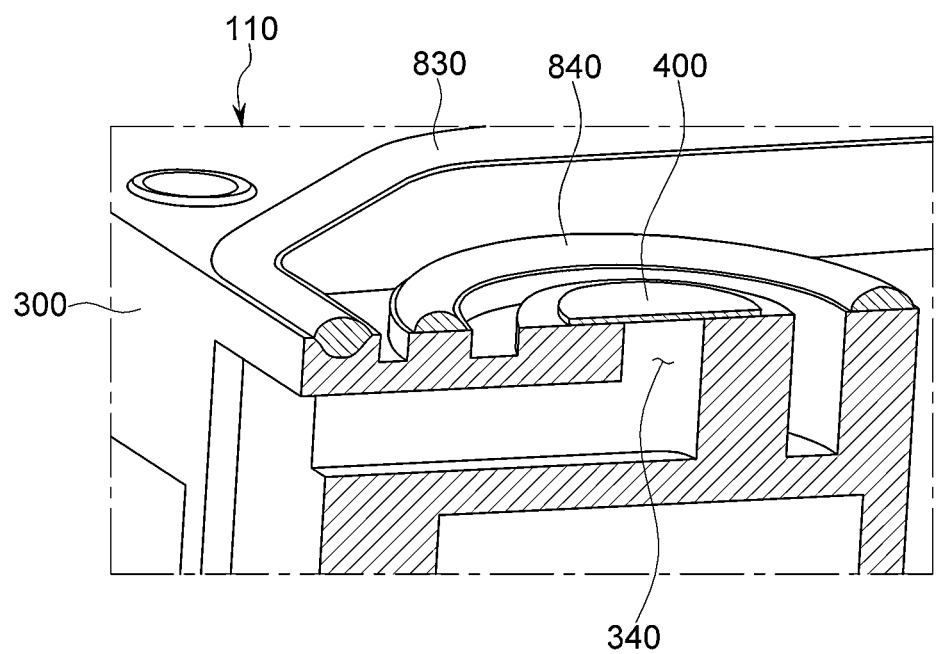
FIG. 4 is a partial cross-sectional perspective view in which a portion of FIG. 3 is cut away.
Figure 5:
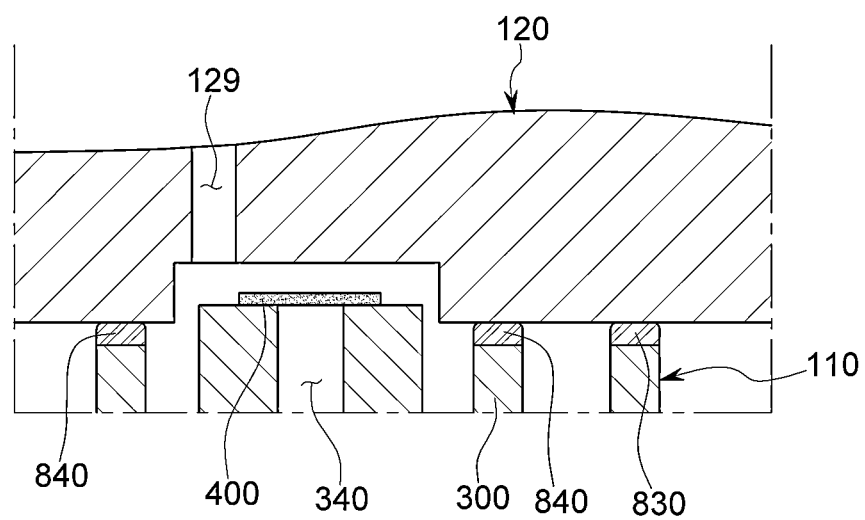
FIG. 5 is a cross-sectional view illustrating a part of an electronic control device supported by the hydraulic valve block of FIG. 2.

As illustrated in FIGS. 3 to 5, the electrical component housing 300 may have a ventilation hole 340 that is opened in a direction of the vent channel 129 of the hydraulic valve block 120 and formed to be connected to the internal space.

For reference, FIG. 3 illustrates an area indicated by F3 in FIG. 2, and FIG. 4 illustrates the internal structure of the electrical component housing 300 by cutting a part of FIG. 3. Moreover, FIG. 5 illustrates a part of the electronic control device 110 supported by the hydraulic valve block 120.

The filter 400 is attached to the electrical component housing 300 to block the ventilation hole 340 so that air can pass therethrough. As an example, the filter 400 may be a membrane filter. The membrane filter 400 is a breathable filter that can transmit air.

In addition, the filter 400 may be attached to the electrical component housing 300 using various methods such as adhesive.

The filter 400 prepared in this way communicates the inside of the electrical component housing 300 with the outside through the vent channel 129 of the hydraulic valve block 120 to suppress a change in internal pressure according to the operation of the electronic control device 110 and stably maintain an equilibrium of the internal pressure.

Meanwhile, when the equilibrium of the internal pressure of the electrical component housing 300 cannot be maintained, due to heat generated by the printed circuit board of the electronic control device 110 that controls the valve of the hydraulic valve block 120 and the electric motor 130 to be described late, the internal pressure rises excessively, and the printed circuit board of the electronic control device 110 may be damaged or a lifespan thereof may be reduced.

A vent sealing member 840 seals a space between the hydraulic valve block 120 and the electronic control device 110, and may be formed to surround the vent channel 129, the ventilation hole 340, and the filter 400.

Accordingly, the vent sealing member 840 may protect the filter 400 and prevent the vent channel 129 from being blocked.

For example, in a process in which air discharged to the ventilation hole 340 of the electrical component housing 300 passes through the filter 400 and heads to the vent channel 129 of the hydraulic valve block 120, the vent sealing member 840 prevent the air from leaking to other places. Moreover, the vent sealing member 840 prevents air, moisture, oil, dust, or foreign substances from other places from adhering to the filter 400 and contaminating the filter 400 and prevents the air, moisture, oil, dust, or foreign substance blocking the vent channel 129 or from being introduced into the electronic control device 110 or hydraulic valve block 120.

The main sealing member 830 may seal the space between the hydraulic valve block 120 and the electronic control device 110, and the electrical component housing 300 may be formed along the edge of the surface facing the hydraulic valve block 120.

In this way, the main sealing member 840 seals one side of the electrical component housing 300 in contact with the hydraulic valve block 120, and thus, can prevent moisture, oil, dust, or foreign substances from being introduced into the electronic control device 110 or the hydraulic valve block 120.

The electric motor 130 may be supported by the other side of the hydraulic valve block 120. In addition, the electric motor 130 may be controlled by a signal transmitted from the electronic control device 110. Specifically, the electric motor 130 may be supported by a surface opposite to one surface of the hydraulic valve block 120 facing the electronic control device 110.

With this configuration, the brake driving apparatus 101 according to one embodiment of the present disclosure can stably maintain the equilibrium of the internal pressure.

Specifically, the brake driving apparatus 101 according to one embodiment of the present disclosure communicates the inside of the electronic control device 110 with the outside to suppress the change in the internal pressure caused by the operation of the electronic control device 110 and stably maintain the equilibrium of the internal pressure.

That is, by maintaining the equilibrium of the internal pressure of the electronic control device 110, it is possible suppress an excessive increase in the internal pressure of the electronic control device 110 due to the heat of the printed circuit board of the electronic control device 110 that controls the valves of the electric motor 130 and hydraulic valve block 120, and thus, it is possible to prevent damages of the printed circuit board or decrease in the lifespan.

Although the embodiment of the present disclosure has been described with reference to the accompanying drawings, those skilled in the art to which the present disclosure pertains can understand that the present disclosure can be implemented in other specific forms without changing the technical spirit or essential features.

Therefore, the embodiment described above should be understood as illustrative in all respects and not limiting, and the scope of the present invention is indicated by the claims to be described later, and all changes or modifications derived from the meaning and scope of the claims and their equivalent concepts should be construed as being included in the scope of the present invention.

DETAILED DESCRIPTION OF MAIN ELEMENTS

101: brake driving apparatus
110: electronic control device
120: hydraulic valve block
129: vent channel
130: electric motor
150: mounting bracket
160: input rod
300: electrical component housing
340: ventilation hole
400: filter
830: main sealing member
840: vent sealing member

What is claimed is:

1. A brake driving apparatus comprising:
   a hydraulic valve block including a vent channel for discharging air to the outside;
   an electronic control device that includes an electrical component housing open in a direction of the vent channel of the hydraulic valve block and having a ventilation hole and a filter attached to the electrical component housing to block the ventilation hole so that air can pass therethrough, and is supported by one side of the hydraulic valve block; and
   a vent sealing member that seals a space between the hydraulic valve block and the electronic control device and surrounds the vent channel, the ventilation hole, and the filter.

2. The brake driving apparatus of claim 1, further comprising a main sealing member formed along an edge of a surface of the electrical component housing facing the hydraulic valve block while sealing the space between the hydraulic valve block and the electronic control device.

3. The brake driving apparatus of claim 2, wherein the vent sealing member and the main sealing member are made of Cured In Place Gaskets (CIPG).

4. The brake driving apparatus of claim 1, wherein the hydraulic valve block has a valve installed therein to control a flow of brake oil, and
   the electronic control device further includes a printed circuit board accommodated in an inner space of the electrical component housing and generating an electrical signal for controlling the valve of the hydraulic valve block.

5. The brake driving apparatus of claim 4, further comprising an electric motor supported on the other side of the hydraulic valve block and controlled by the electronic control device.

6. The brake driving apparatus of claim 1, wherein the filter includes a membrane filter.

* * * * *